Feb. 13, 1940. H. FELDMEIER ET AL 2,190,584
HEAT EXCHANGE DEVICE
Filed Nov. 28, 1931 4 Sheets-Sheet 4
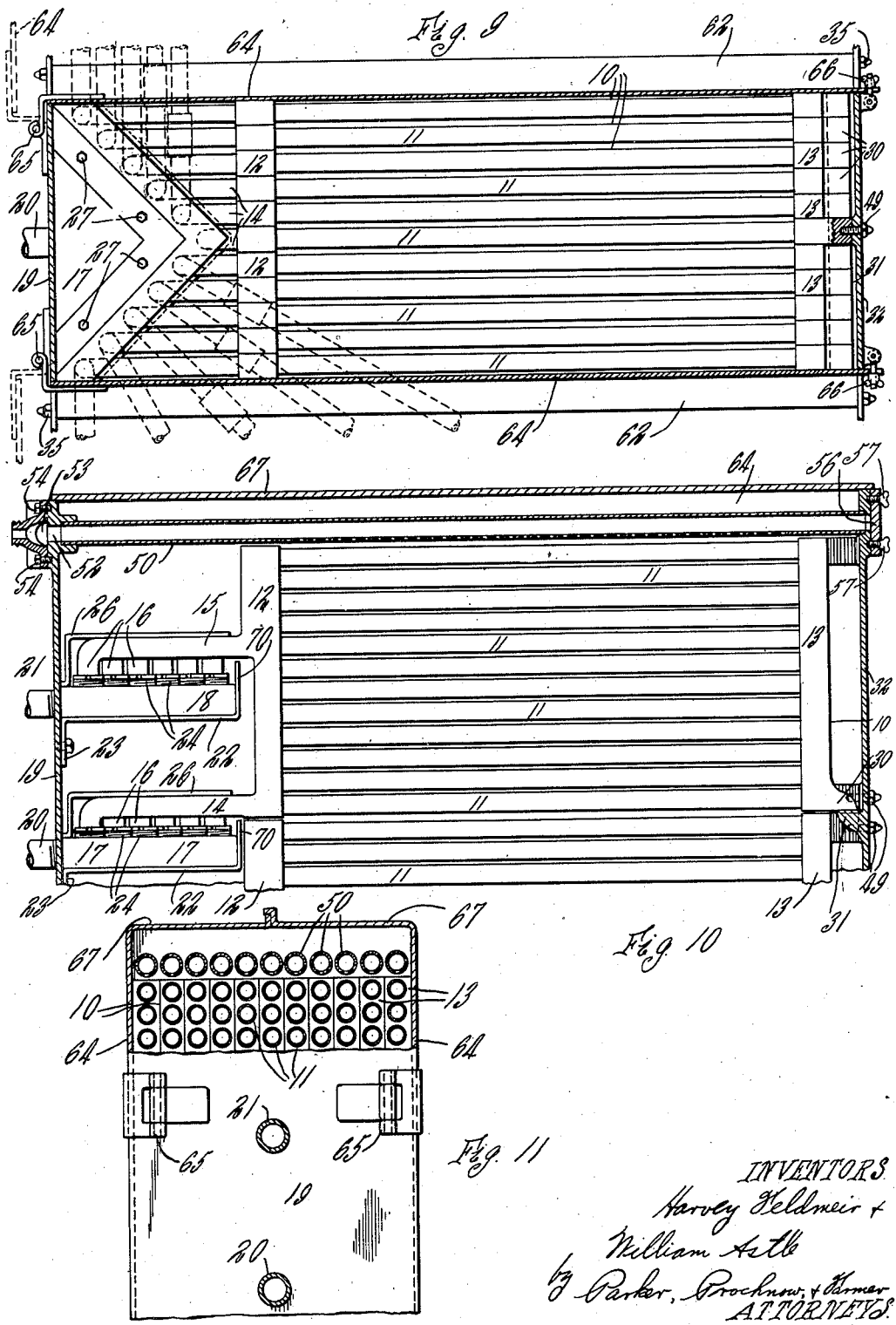
INVENTORS
Harvey Feldmeier &
William Astle
by Parker, Prochnow, & Kramer
ATTORNEYS Patented Feb. 13, 1940

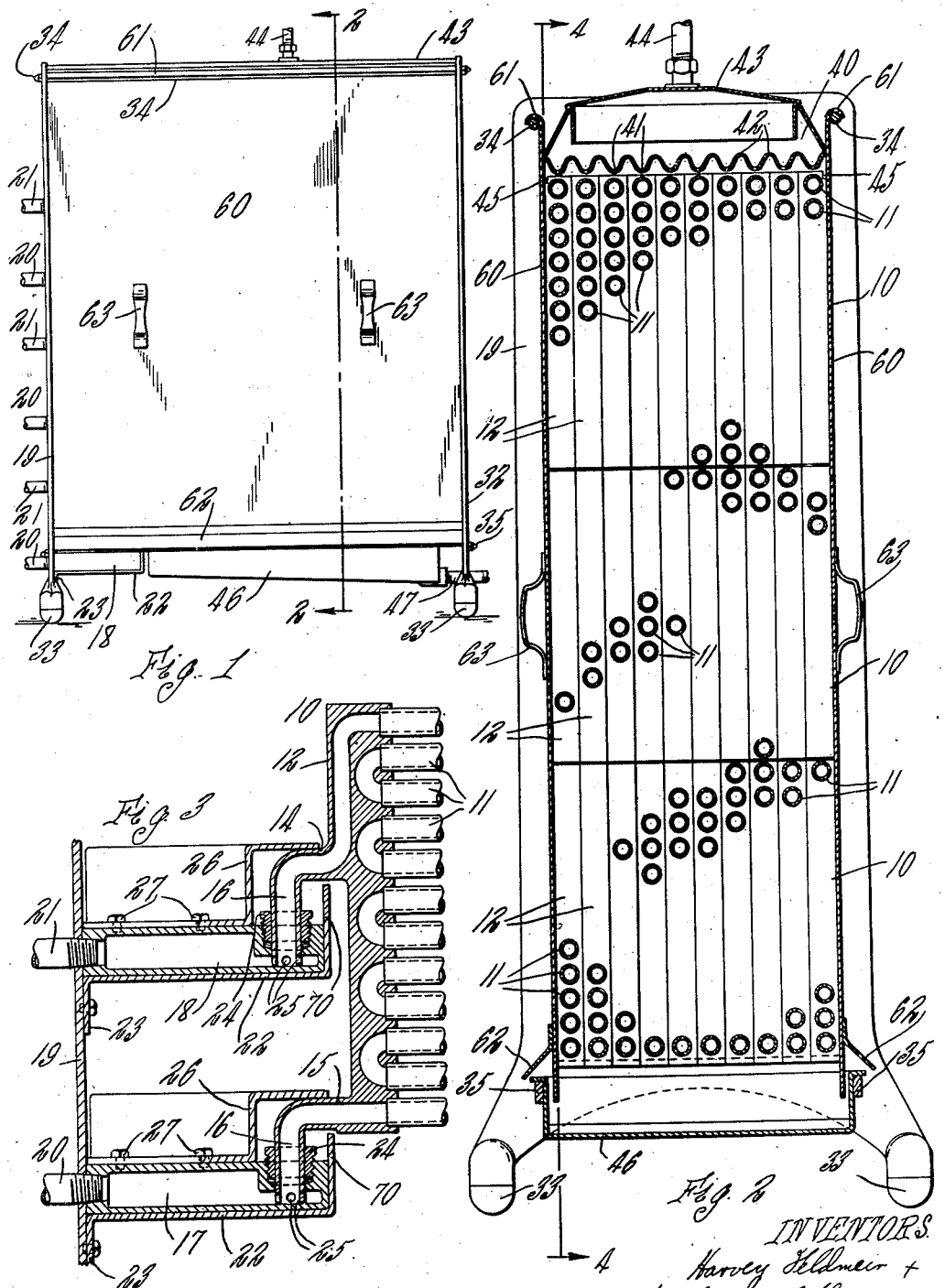

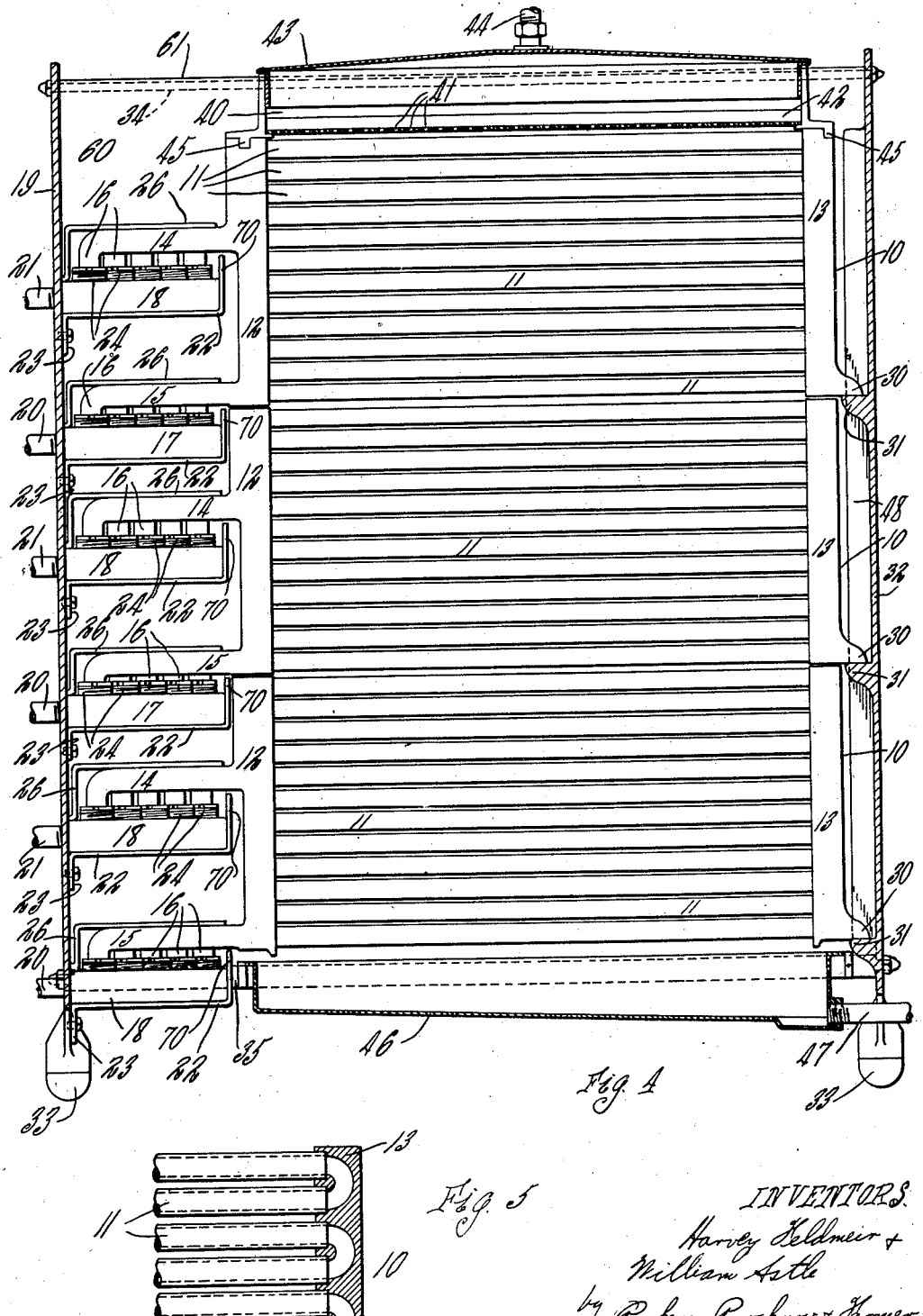

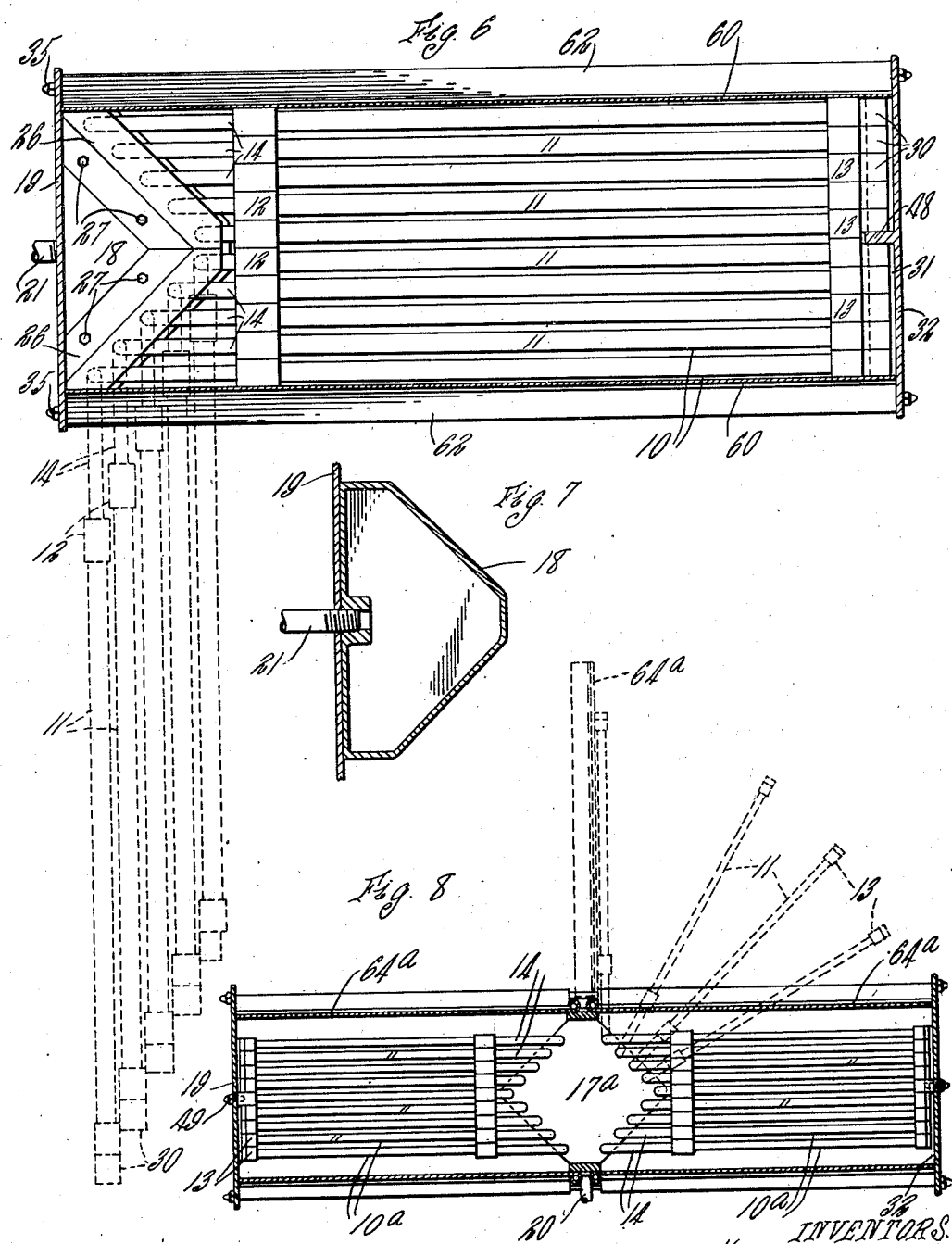

2,190,584

UNITED STATES PATENT OFFICE 2,190,584

HEAT EXCHANGE DEVICE

Harvey Feldmeier and William Astle, Little Falls, N. Y., assignors to Cherry-Burrell Corporation, Wilmington, Del., a corporation of Delaware Application November 28, 1931, Serial No. 577,829

16 Claims. (Cl. 257—184)

This invention relates to heat exchange devices for cooling or heating liquids such as milk, and more particularly to improvements in heat exchange devices of the character disclosed in the application for United States Patent, Serial Number 399,462, filed October 14, 1929, by Harvey Feldmeier (now Patent No. 1,840,573), which comprises a plurality of heat exchange sections or units over which the milk or liquid flows in heat exchange relation to a cooling or heating medium circulating through the sections or units, and which sections or units are movably mounted or arranged so that they can be placed in a close or compact side by side operative arrangement and can be readily shifted, separated, or spread apart to make the several parts of the apparatus easily accessible for cleaning or other purposes.

For the sake of clarity and brevity of description, the liquid to be cooled or heated and the cooling or heating water, brine or other medium will be hereinafter designated respectively as "milk" and "heat exchange medium" but it is not intended thereby to limit the invention to use in connection with milk or any particular heat exchange medium.

One object of the present invention is to provide a device of this character which is of novel and desirable construction and which will be efficient in operation and have a large capacity and yet be of relatively small size and compact form.

Other objects of the invention are to provide a heat exchange device of the character mentioned which comprises a plurality of heat exchange sections arranged to readily swing to and from operative positions in which they extend close together side by side beneath distributing means from which the milk is delivered to the several sections; in which means are provided for properly aligning the sections in operative position relatively to the distributor so as to ensure the intended proper flow of the milk over each of the several sections; in which means of simple construction are provided for preventing any leaking heat exchange medium from reaching and contaminating the milk; and which embodies other features of improvement and advantages hereinafter described and set forth in the claims.

The accompanying drawings illustrate different embodiments of the invention.

In said drawings:

Fig. 1 is a side elevation on a reduced scale of one embodiment of our heat exchanger.

Fig. 2 is a transverse sectional elevation thereof.

Fig. 3 is an enlarged longitudinal section of the hinged end of one of the movable sections.

Fig. 4 is a sectional elevation on line 4—4, Fig. 2.

Fig. 5 is a fragmentary section of the free end of one of the sections.

Fig. 6 is a sectional plan view of the heat exchanger.

Fig. 7 is a horizontal section of one of the stationary headers for the heat exchange medium.

Fig. 8 is a sectional plan illustrating a double ended modification of the device.

Fig. 9 is a sectional plan of another modification.

Fig. 10 is a fragmentary vertical longitudinal sectional elevation thereof.

Fig. 11 is a fragmentary end elevation partly in section thereof.

Referring first to the construction shown in Figs. 1 to 7, the device comprises a plurality of heat exchange sections or units 10 adapted to stand closely together side by side and preferably within an inclosing cabinet. Each of the sections may be of known construction comprising a plurality of horizontal tubes 11 arranged vertically one above another and connected at opposite ends to headers 12 and 13 in such a manner that the heat exchange medium admitted to one of the headers will circulate through the several tubes of the section in succession, and may be discharged through a discharge connection from the same header. As shown, said sections 10 are arranged in a plurality of vertical groups each comprising three of the sections disposed vertically one above another, and said vertical groups of sections are adapted to stand side by side as shown in Fig. 6.

Preferably, the several sections 10 are separately or independently hinged at one end eccentrically so as to swing independently horizontally or laterally relative to one another from positions in which they extend parallel close to each other side by side, to positions in which they extend outwardly at an angle from the first mentioned positions, for which purpose, as shown, the header 12 of each section is provided with upper and lower hollow hinge arms 14 and 15 which are hinged by vertical tubes 16 to stationary supply and discharge headers 17 and 18 for the heat exchange medium. These stationary headers 17 and 18 for the several sections of the device are arranged one above another at one end of the sections 10 and are shown as being rigidly secured to the adjacent vertical end wall 19 of a supporting frame or housing for the sections. The stationary headers 17 and 18 may be provided with inlet and discharge pipes 20 and 21 passing through the end wall 19 and each said header may be secured on and supported by a bracket 22 rigidly secured by a flange 23 at one end thereof to the wall 19. Each vertical hinge tube 16 passes through a packing gland 24 in the top of one of the headers 17 or 18. The hinge tubes 16 can turn in the glands 24 to provide the hinge connections for the heat exchange sections and these hinge connections, as well as the arms 14 and 15, being hollow and communicating with the interior of the headers 17 and 18, as by holes 25 in the lower ends of the tubes 16, constitute fluid passages for the flow of the heat exchange medium between the headers 17 and 18 and the hinged sections. As clearly shown in Fig. 3, the bottom ends of the hinge tubes 16 bear down upon the bottom walls of the headers 18, which thus form bearings that carry the vertical component of the weight of the sections and serve to retain the sections in their intended relation. The connections are such that the heat exchange medium admitted through the pipe 20 to one header 17 can pass through the hinge arm 15 into the header 12 of the related section 10, thence through the tubes of said section and discharge through the hinge arm 14 and connected hinge tube, to the next stationary header 18, from which it may discharge through the pipe 21. It will be understood that the several hinged sections 10, which are located side by side at the same level, are hinged to the same pair of stationary headers 17 and 18, and the other sections at different levels are hinged to different pairs of headers 17 and 18.

Part 26 represents Z-shaped members one of which is detachably secured, as by bolts 27, on top of each of the headers 17 and 18, and has a flange overhanging the adjacent hinged arms 14 or 15 which are hinged to that header for retaining the hinge tubes in the glands against the fluid pressure and preventing the disconnection of the sections from the headers 17 and 18 without first detaching the member 26.

At its opposite free end, each of the heat exchange sections is preferably provided with a lug or part 30 adapted to bear and slide upon a supporting track 31 secured to the adjacent vertical end wall 32 of the frame or housing. These tracks support the weight of the free ends of the sections and relieve the hinge connections of the sections from strain. The vertical end walls 19 and 32 may rest at their lower ends, as by feet 33, on the floor and may be rigidly connected, as by upper and lower longitudinal tie rods 34 and 35, thereby forming a stationary supporting frame for the hinged sections. The end walls, as hereinafter explained, also constitute parts of a cabinet or housing for enclosing the heat exchange sections.

As shown in the drawings, the headers 17 and 18 are of substantially triangular form in plan and the heat exchange sections are hinged to each header at points arranged in stepped order or on lines diverging horizontally from the inner ends of the header outwardly preferably at an angle of 45° to the longitudinal axis of the header. By this arrangement of the hinge connections, the sections are adapted to swing from the positions in which they extend parallel with each other lengthwise in the frame to positions in which they extend parallel with each other outwardly at right angles to their lengthwise positions as indicated by broken lines in Fig. 6.

The milk is discharged onto the several heat exchange sections so as to flow downwardly over their outer surfaces when the sections are in their operative side by side positions from suitable delivery or distributing means located over the sections. In the construction shown in Figs. 1 to 7, a distributor in the form of a trough or receptacle 40 is employed. This trough extends lengthwise between end walls 19 and 32 above the sections 10 and has in its bottom parallel longitudinal rows of perforations 41, each row arranged vertically over one of the sections 10 in the operative position thereof so that the milk or liquid will flow from the trough onto the top tube of each of the sections. The trough shown has its bottom formed with longitudinal corrugations 42, each row of perforations being formed centrally in the bottom of one corrugation. Part 43 represents a removable cover for the trough provided with an inlet opening 44 for the milk. The trough may be supported in any suitable way, it being shown removably seated on the tops of the hinged sections. Lugs 45 depending from the ends of the trough at opposite sides of the headers 12 and 13 for the outer sections serve to retain the hinged sections together in their operative position. The milk flows downwardly over the external surfaces of the tubes of the several sections 10 and flows off of the lower ends of the sections into a bottom trough or receiver 46 of suitable construction located beneath the sections. This trough, as shown, is supported by the lower tie rods 35 and is provided at one end with the usual discharge pipe connection 47.

Means are provided to insure that when the heat exchange sections are swung into side by side position, each section will be disposed or held accurately in operative position directly beneath or in the vertical plane of one of the rows of perforations in the trough. For this purpose, in the construction shown in Figs. 1 to 7, the end wall 32 of the cabinet is provided with a central vertical stop rib 48 against the opposite faces of which the lugs 30 on the two central sections are adapted to abut to arrest said sections in their operative positions. When these sections thus bear against the stop 48 and the remaining sections are swung inwardly until arrested by the engagement of the headers 13 at their outer ends with each other, and with the headers of the two central sections, the several sections will be accurately positioned each beneath one of the rows of perforations in the distributor trough.

In the construction illustrated in Figs. 9 to 11, the central heat exchange section is stationarily secured in position as by having its outer end secured by bolts 49 to the vertical end wall 32 and this central section serves as the stationary stop by which the sections at opposite sides thereof are arrested when swung inwardly, to properly align each section in operative position beneath a row of perforations of the distributor.

In this latter construction, the milk distributor comprises a plurality of longitudinal distributor pipes 50 each arranged longitudinally and vertically above one heat exchange section and provided on its bottom with perforations through which the milk discharges from the pipe 50 onto the section. As shown, the several distributor pipes 50 are secured at their opposite ends in holes in the opposite end walls 19 and 32 and the pipes are connected at one end by openings 52 in the wall 19 with a common supply passage 53 formed in a casting removably clamped against the outer face of the wall 19 by screws 54. The other ends of the distributor pipes 50 are closed by a plate 56 clamped by screws 57 against the outer side of the wall 32 over the holes in which said ends of the pipes are secured. The several distributor pipes 50 are thus closed at one end and connected to the supply passage or header 53 at the other end but the closures for the opposite ends of the pipes can be readily removed for rendering the pipes accessible for cleaning.

The vertical end walls 19 and 32 of the supporting frame cooperate with side walls or closures to form a cabinet or housing for inclosing the sections when they are in their operative positions extending lengthwise between the end walls, such side walls being arranged for movement or removal to permit the sections to be swung outwardly to render the sections accessible for cleaning. In the construction first described, the opposite side walls 60 are removably supported by engagement of their flanged upper edges 61 with the tie rods 34 connecting the upper ends of the end walls, and their lower edges project down into the bottom milk trough or receiver. At their lower portions, the side walls 60 are provided with outwardly projecting inclined flanges or plate 62 which overlie the upper edges of the sides of the bottom trough and are adapted to engage said edges to hold the lower edges of the side walls in position. These flanges also shed off any moisture or dust which may run down the side walls and prevent the same from entering the milk trough. Part 63 represents handles by which the side walls can be lifted to disengage them from the supporting rods and remove the walls to open the cabinet when the sections are to be swung out for cleaning or other purposes. The side and end walls cooperating with the top and bottom troughs effectively enclose the heat exchange sections 10.

In the second construction shown in Figs. 9 to 11, the side walls 64, which cooperate with the end walls 19 and 32 to enclose or house the sections 10, are hinged at one end at 65 to end wall 19 of the frame, and fastening devices formed conveniently by screws 66 pivoted on the other end 32 and equipped with thumb nuts for engagement with the free ends of the hinged side walls 64 serve for securing the side walls firmly against the opposite side edges of the end wall 32. The hinged side walls shown are provided at their upper ends with inwardly extending wide flanges or plates 67 which are adapted to meet or overlap over the distributor pipes to form a top wall or closure for the cabinet or housing.

Shields or baffles 70 arranged between the heat exchange surfaces of the sections 10 and the hinge joints connecting the sections with stationary headers 17 and 18 prevent any water or other medium, which may leak through said joints, from reaching and contaminating the milk. These shields are conveniently formed by flanges which project up from the inner ends of the brackets above the tops of the headers supported by said brackets.

Figure 8 illustrates a modification which is substantially similar to the constructions already described except that the sections 10 are arranged in duplicate assemblies extending in opposite directions from the stationary headers 17ᵃ to which they are hinged and which are arranged centrally between the opposite end walls 19 and 32 of the housing. This arrangement gives an apparatus of double the capacity of the first two constructions without increasing the width or height of the device. In this modification, four side closures or walls 64ᵃ can be hinged at the sides of the headers 17ᵃ and cooperate with the end walls to enclose the hinged sections, and the supply and discharge pipes 20ᵃ for the heat exchange medium can connect with the headers at one side of the device.

The invention is hereby claimed as follows:

1. A heat exchanger for liquids, such as milk, comprising a plurality of sections hinged at corresponding ends of the several sections to swing laterally relative to one another away from operative positions in which they stand close together side by side to positions in which the sections are accessible for cleaning, means for supplying a heat exchange medium to the several sections and including flexible connections operable to permit said swinging movements of said sections, means for delivering the liquid separately to said several sections when in their operative positions, and baffle means segregating the flexible connections of said supply means from the heat exchange surfaces of said sections for preventing any leaking heat exchange medium from reaching and contaminating the liquid.

2. A heat exchanger for liquids, such as milk, comprising a plurality of heat exchange sections hinged at corresponding ends of the several sections to swing laterally relative to one another, heat exchange medium supply means for the several sections, hollow hinge connections for establishing communication between the interior of said sections and said supply means, means for distributing the liquid to said sections, and baffle means substantially closing the space occupied by said hinges for preventing any leaking heat exchange medium from reaching the liquid.

3. The combination of a group of relatively thin upright heat exchange sections arranged to stand side by side and over which liquid may flow in heat exchange relation to a heat exchange medium, a distributor above the sections for delivering the liquid thereto, an upright support at one end of the group of sections on which the sections are mounted to swing laterally for spreading them apart, separate means at the free ends of each of the sections extending laterally therefrom and comprising an integral element of each respective section and adapted to be placed in close juxtaposed relation when said sections are in operative position, and upright housing walls at opposite sides of said group of sections hinged on said support to open outwardly to allow said spreading of the sections and having top portions which extend inwardly over said distributor, said walls and top portions together with said support and said separate means at the free ends of each of the sections forming a housing for the sections and distributor and liquid flow space intermediate the sections.

4. The combination of a group of relatively thin upright heat exchange sections arranged to stand side by side and over which liquid flows in heat exchange relation to a heat exchange medium, a supporting frame on which the sections are hinged at one end to swing laterally for spreading them apart, and means for movably supporting the free ends of said sections and relieving strain on their hinges comprising a track on said frame and parts on the free ends of the sections arranged to movably bear on said track.

5. The combination of a group of relatively thin upright heat exchange sections arranged to stand side by side, a removable distributor trough supported on said sections and having outlets arranged to deliver separate streams of liquid to said several sections to flow over the sections in heat exchange relation to a heat exchange medium, said sections being mounted to swing laterally relative to the operative position occupied by said trough when the sections are in operative position for spreading the sections apart, and downwardly extending elements at the bottom of said distributor trough and integrally formed therewith for overlappingly engaging a plurality of said sections when said sections and trough are in operative position for releasably holding the group of sections alined with their respective outlets in the bottom of said trough in the predetermined side by side positions of the sections.

6. The combination of a group of relatively thin upright heat exchange sections arranged to stand side by side, a support adjacent to one end thereof, hinges mounting the sections on said support to swing laterally, distributing means for causing liquid to flow over said sections in heat exchange relation to a heat exchange medium, said hinges being hollow and forming parts of circulating means for said heat exchange medium and being disposed in a stepped arrangement with the hinges for the successive sections, from the innermost outwardly, located successively farther from a plane perpendicular to the plane of said innermost section and passing through the axis of the hinge of said innermost section, thereby allowing the sections to swing from their side by side positions to positions substantially perpendicular thereto, and lugs at the bottom of said distributing means engaging a plurality of sections and releasably holding the group of sections in predetermined operative position below the distributing means.

7. The combination of a group of thin upright heat exchange sections arranged to stand parallel side by side and over which liquid is caused to flow in heat exchange relation to a heat exchange medium, hinge means supporting said sections to swing laterally for spreading them apart, distributing means for delivering the liquid to the sections when side by side comprising a removable distributor arranged above the sections and provided with parallel longitudinal rows of discharge perforations, and means for arresting the movement of the several sections toward each other in positions with each section vertically beneath one of said rows of discharge perforations, said means including spacing members at the free end of each section adapted for placement in abutting relation when the sections are in operative position for holding the heat exchange portions of said sections spaced in their parallel positions correspondingly with said rows of perforations, and a stationary member rigidly fixed to the supporting frame of the mechanism which arrests the inward swinging of the sections when in operative position.

8. The combination of a group of relatively thin upright heat exchange sections arranged to stand side by side, a supporting frame on which said sections are hinged at one end to swing laterally for spreading them apart, a relatively stationary distributor above said sections for delivering the liquid thereto, means for movably supporting the free ends of said sections and relieving strain on their hinges comprising a track on said frame and parts on the free ends of said sections arranged to movably bear on said track, and a stationary abutment on said frame which arrests said sections when swung inwardly into their side by side positions properly alined relatively to said liquid distributor.

9. A heat exchanger for liquids, comprising a stationary supporting frame, a central upright heat exchange section fixed in said frame, a plurality of upright heat exchange sections arranged to stand at opposite sides of and parallel with said fixed section and hinged to said frame to swing laterally out for spreading the sections apart, a distributor removably supported by said frame and having parallel outlets for discharging the liquid onto the several sections, alining devices each hinged at one end thereof to said supporting frame, and adapted to contact the outermost sections and be swung into a position which will crowd said swinging sections together and the inner swinging sections against said fixed section to hold said swinging sections alined with said parallel outlets of the distributor, and locking means to lock said alining devices in position when said sections have been crowded into operative position.

10. A heat exchanger for liquids comprising a plurality of upright heat exchange sections arranged to stand side by side and hinged at corresponding ends to swing laterally for spreading them apart, a single liquid distributing receptacle mounted above said sections and having longitudinal corrugations in its lower wall, perforations in said corrugations for distributing liquid over said several sections, said perforations being disposed in rows lengthwise of said corrugations with each row in alinement with one of said sections when in said side by side position, heat exchange medium manifolds, said hinges being hollow and in communication with said headers and the interior of said several sections for supplying heat exchange medium to said sections, and rigid downwardly extending means positioned at the bottom of said distributing receptacle and overlappingly engaging a plurality of said heat exchange sections when in their operative position, whereby the upper edge of each of said heat exchange sections is maintained in operative alinement below a complementary corrugation in the bottom of said distributing receptacle, said corrugation having perforations therein through which liquid is distributed from said receptacle onto the upper edge of the respective heat exchange sections alined therewith.

11. A heat exchanger for liquids comprising a plurality of eccentrically mounted upright heat exchange sections hinged at corresponding ends by hollow hinges to swing laterally relative to one another, a common heat exchange medium supply header for the several sections in communication with the hollow hinges supporting said sections, and bearing means on said header engaging complementary bearing means on the header-ends of said hollow hinges arranged to transfer the vertical component of the weight of the said eccentrically mounted sections to said header and maintain the sections in predetermined, spaced vertical relation one to another.

12. A heat exchanger for liquids, such as milk, comprising a plurality of upright heat exchange sections arranged to stand side by side and hinged at corresponding ends to swing laterally for spreading the sections apart, a common heat exchange medium supply header for the several sections, said hinges being hollow to establish communication between the interior of said sections and said supply header, a unitary liquid distributing means having outlets disposed to distribute liquid separately over said several sections, and lugs at the bottom of said distributing means and cooperating with the free ends of said sections for alining and holding them in close side by side operative positions in alinement with said outlets of the liquid distributing means.

13. A heat exchanger for liquids as set forth in claim 12 and having a supporting frame for the sections, and means carried by the free ends of said sections slidingly engaging a track on said frame adjacent the free end of said sections when said sections are in their operative position to support the weight of said sections.

14. In a heat exchanger for liquids mounted in a frame, the combination of a heat exchange section support mounted on said frame centrally between its ends, a plurality of heat exchange sections extending longitudinally of said frame and arranged in two groups at the opposite ends of said support and hinges mounting said sections on said central support to swing laterally relative to one another from operative positions in which they stand close together to positions in which they are easily accessible for cleaning, and laterally extending means at each end of each of said sections, said laterally extending means being so constructed and arranged that when said sections are in their operative position the adjacent laterally extending means constitute a substantial end closure for the liquid flow space intermediate the respective adjacent sections.

15. In combination a plurality of heat exchange sections hinged at corresponding ends of the several sections to swing laterally relative to one another away from operative positions in which they stand close one to another, a common heat exchange medium supply header for the several sections, hollow hinges communicating with said sections and said header to provide heat exchange medium passages between said sections and said header, a unitary distributing pan having perforations in its lower wall in rows disposed to aline with the several sections when in their operative position for delivering liquid to the several sections, and fixed elements at the bottom of said distributing pan to overlap and engage the said sections when in operative position to locate and hold said sections each in alinement with a row of said perforations in said distributing pan when in their operative positions.

16. A heat exchanger for liquids, comprising a stationary frame, a central upright heat exchange section fixed in said frame, upright heat exchange sections arranged to stand at opposite sides of and parallel with said fixed section and hinged to said frame to swing laterally out for spreading the sections apart, a removably supported distributor above said sections having parallel outlets for discharging the liquid onto the several sections, said hinged sections having upright headers at each end thereof for the passage of the heat exchange medium and being so constructed and arranged that when the sections are in their operative positions the adjacent headers will abut each other, and devices arranged to engage the free ends of the said swinging sections when in operative position and hold said swinging sections with their headers abutting and the headers of the inner swinging sections against the headers of said fixed section to hold the swinging sections alined with said parallel outlets of the distributor, said abutting headers forming enclosure walls for the liquid flow spaces intermediate the sections.

HARVEY FELDMEIER.
WILLIAM ASTLE.